United States Patent
Ishigaki

(10) Patent No.: US 12,043,204 B2
(45) Date of Patent: Jul. 23, 2024

(54) BUCKLE FOR SEAT BELT DEVICE AND SEAT BELT DEVICE

(71) Applicant: Autoliv Development AB, Vargarda (SE)

(72) Inventor: Ryo Ishigaki, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 226 days.

(21) Appl. No.: 17/652,235

(22) Filed: Feb. 23, 2022

(65) Prior Publication Data

US 2022/0266789 A1 Aug. 25, 2022

(30) Foreign Application Priority Data

Feb. 24, 2021 (JP) ................................ 2021-027180

(51) Int. Cl.
*A44B 11/25* (2006.01)
*B60R 22/12* (2006.01)
*B60R 22/26* (2006.01)

(52) U.S. Cl.
CPC .............. *B60R 22/12* (2013.01); *B60R 22/26* (2013.01)

(58) Field of Classification Search
CPC ............ A44B 11/2515; A44B 11/2592; A44B 11/2546; Y10T 24/45665; Y10T 24/45623; B60R 22/12; B60R 22/26
See application file for complete search history.

(56) References Cited

U.S. PATENT DOCUMENTS

| 6,216,323 | B1 * | 4/2001 | Oyamada | A44B 11/2523 |
| | | | | 24/640 |
| 9,877,548 | B2 | 1/2018 | Murase | |
| 10,188,178 | B2 | 1/2019 | Murase | |
| 2005/0086777 | A1 * | 4/2005 | Kawai | A44B 11/2523 |
| | | | | 24/633 |
| 2013/0174390 | A1 * | 7/2013 | Muromachi | A44B 11/2546 |
| | | | | 24/633 |

(Continued)

FOREIGN PATENT DOCUMENTS

| EP | 2987686 B1 | 4/2019 |
| JP | 2001-010442 A | 1/2001 |

(Continued)

OTHER PUBLICATIONS

English translation of Notification of Grounds for Rejection of KR 10-2022-0023521, mailed Aug. 7, 2023.

*Primary Examiner* — Robert Sandy
*Assistant Examiner* — Michael S Lee
(74) *Attorney, Agent, or Firm* — DICKINSON WRIGHT PLLC

(57) ABSTRACT

A buckle for a seat belt device has a latch member that is configured to be engaged with a tongue when the tongue is inserted into the buckle; a buckle base having a bottom wall and a first side wall and a second side wall that stand up from the opposite side edges of the bottom wall, each of the first and second side walls having latch holding portions that hold the latch member, the latch holding portions each being formed of a cutout extending from an upper end of each of the first and second side walls of the buckle base; and a bridging member configured to be assemblable to the first and second side walls so as to span the latch holding portions in a front-rear direction.

14 Claims, 6 Drawing Sheets

(56) References Cited

U.S. PATENT DOCUMENTS

2016/0021987 A1    1/2016  Murase
2018/0078002 A1    3/2018  Murase

FOREIGN PATENT DOCUMENTS

| JP | 2011-167445 A | 9/2011 |
| JP | 2014-210482 A | 11/2014 |
| KR | 10-1504228 B1 | 3/2015 |
| WO | 2014171195 A1 | 10/2014 |

\* cited by examiner

BUCKLE FOR SEAT BELT DEVICE AND SEAT BELT DEVICE

CROSS-REFERENCE TO RELATED APPLICATIONS

This application claims priority pursuant to 35 U.S.C. 119(a) to Japan Patent Application No. 2021-027180, filed Feb. 24, 2021, which application is incorporated herein by reference in its entirety.

FIELD

The present invention relates to a buckle for a seat belt device.

DESCRIPTION OF RELATED ART

In a seat belt device mounted to a vehicle seat, a buckle that detachably locks a tongue attached to a webbing is provided near the seat. The buckle transfers to the vehicle body a tensile load that acts on the webbing upon a vehicle collision.

In general, in a buckle, a channel-shaped buckle base is fixed to a vehicle body via a plate-shaped buckle stay (see, for example, JP2014-210482 A and JP2001-010442 A). A latch member is held by a pair of side walls of the buckle base, and when a tongue is inserted into an insertion opening of the buckle, the latch hole of the tongue is engaged with the latch member, thereby locking the tongue to the buckle (see, for example, JP2011-167445 A).

The buckles disclosed in JP2014-210482 A and JP2001-010442 A are what are commonly referred to as swing buckles, where the buckle body is configured to be tiltable in the width direction of a seat and rotatable in the front-rear direction of the seat, with respect to the buckle stay. In such swing buckle, a swing structure constituted by a coil spring, a spring retaining member, etc. is provided in association with a buckle base, on a rear side with respect to the position at which a latch member is held (i.e., at the side opposite to an insertion opening for a tongue).

In the case of swing buckles, unlike normal buckles, a load is input from the portions of a buckle base that are associated with a swing structure (in particular, a bottom wall and the upper parts of a pair of side walls) upon a vehicle collision. The input of load from the upper parts may produce bending stress in the buckle base. In the case where the upper ends of the pair of side walls have cutouts on a front side with respect to the swing structure, as in the buckle base of JP2014-210482 A, bending stress concentrates on the cutout portions. This may result in deformation that widens the upper parts of the cutout portions.

In consideration of such deformation, it is also conceivable to take measures that do not form cutouts as mentioned above on a buckle base. For example, as disclosed in JP2011-167445 A, it is conceivable to form support holes in a pair of side walls of a buckle base and engage a pair of support arms of a latch member with the support holes. However, with such configuration, the latch member needs to be twisted when assembling the latch member to the buckle base. This reduces workability, which makes it difficult to adapt to automated assembly in the future.

SUMMARY

An object of the present invention is to provide a buckle for a seat belt device that can achieve both improvement of the breaking strength and robustness of a buckle base and improvement of the assemblability of a latch member.

A buckle for a seat belt device according to one aspect of the present invention comprises: a latch member configured to be engaged with a tongue when the tongue is inserted into the buckle; a buckle base having a bottom wall and a first side wall and a second side wall that stand up from opposite side edges of the bottom wall, each of the first and second side walls having a latch holding portion that holds the latch member, the latch holding portion being formed of a cutout extending from an upper end of each of the first and second side walls; and a bridging member configured to be assemblable to the first and second side walls so as to span the respective latch holding portions in a front-rear direction.

According to the above aspect, the latch holding portions are each formed of a cutout extending from the upper end of each of the first and second side walls; therefore, in holding the latch member in the latch holding portions, the latch member can be inserted, from above, into the cutout portions at the upper ends of the first and second side walls so as to be arranged in the latch holding portions. This allows the latch member to be held in the latch holding portions without being twisted. Accordingly, it is possible to improve the assemblability of the latch member to the buckle base.

Further, since the bridging member is assembled to the first and second side walls so as to span the latch holding portions, deformation in a direction that widens the cutout portions at the upper ends of the first and second side walls can be suppressed upon load input. Accordingly, it is possible to improve the breaking strength and robustness of the buckle base.

In one aspect of the present invention, each of the first and second side walls may have a front engagement groove formed on a front side with respect to the latch holding portion and a rear engagement groove formed on a rear side with respect to the latch holding portion, and the bridging member may have front engagement protrusions and rear engagement protrusions that are assemblable to the respective front engagement grooves and the respective rear engagement grooves.

According to the above aspect, the bridging member is assembled to at least four places of the first and second side walls, the four places being located in front and rear sides with respect to the latch holding portions. This allows the bridging member to be assembled to the first and second side walls with better balance, thereby effectively suppressing deformation in a direction that widens the cutout portions at the upper ends of the first and second side walls.

In one aspect of the present invention, the front engagement grooves and the rear engagement grooves may be formed at the respective upper ends of the first and second side walls.

According to the above aspect, the bridging member is assembled to the upper ends of the first and second side walls, which allows for assembly of the bridging member by fitting the bridging member, from above, into the first and second side walls. This can improve the assemblability of the bridging member to the buckle base.

In one aspect of the present invention, the buckle may further comprise an elastic member arranged on a rear side with respect to the latch holding portions, and the bridging member may press the elastic member toward the bottom wall.

According to the above aspect, the bridging member can be effectively utilized as a retainer for the elastic member.

DETAILED DESCRIPTION

Preferred embodiments of the present invention will be described below with reference to the attached drawings. In the specification, the up-down direction, the right-left direction, and the front-rear direction are defined as follows: the direction perpendicular to the wall surface of a bottom wall of a buckle base is defined as the up-down direction, where the direction in which two side walls, which are connected to the opposite side edges of the bottom wall, stand up, is defined as an upward direction; the direction in which the two side walls are facing each other is defined as the right-left direction; and the direction parallel to the wall surface of the bottom wall and orthogonal to the right-left direction is defined as the front-rear direction. It should be noted that, when the buckle of the present embodiment is installed at a side of a seat of a vehicle, the up-down direction above corresponds to the width direction of the seat, the right-left direction above corresponds to the front-rear direction of the seat, and the front-rear direction above corresponds to the insertion and removal direction of a tongue.

Figure 1:
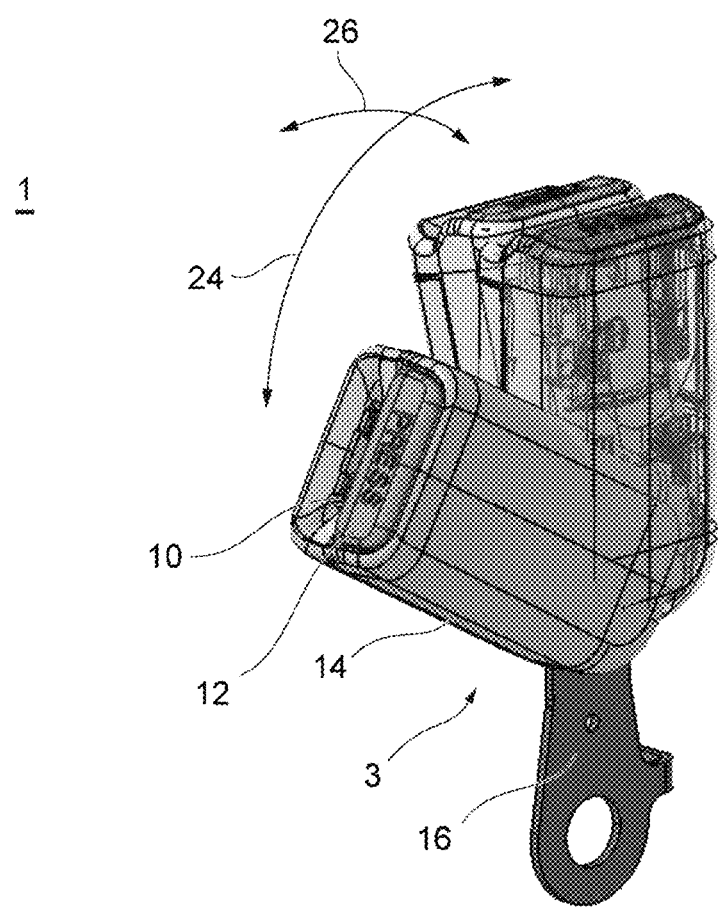
FIG. 1 is a perspective view showing a buckle of a seat belt device according to an embodiment, showing a state in which a buckle body is at an original position and a state in which the buckle body has been rotated and tilted.
Figure 2:
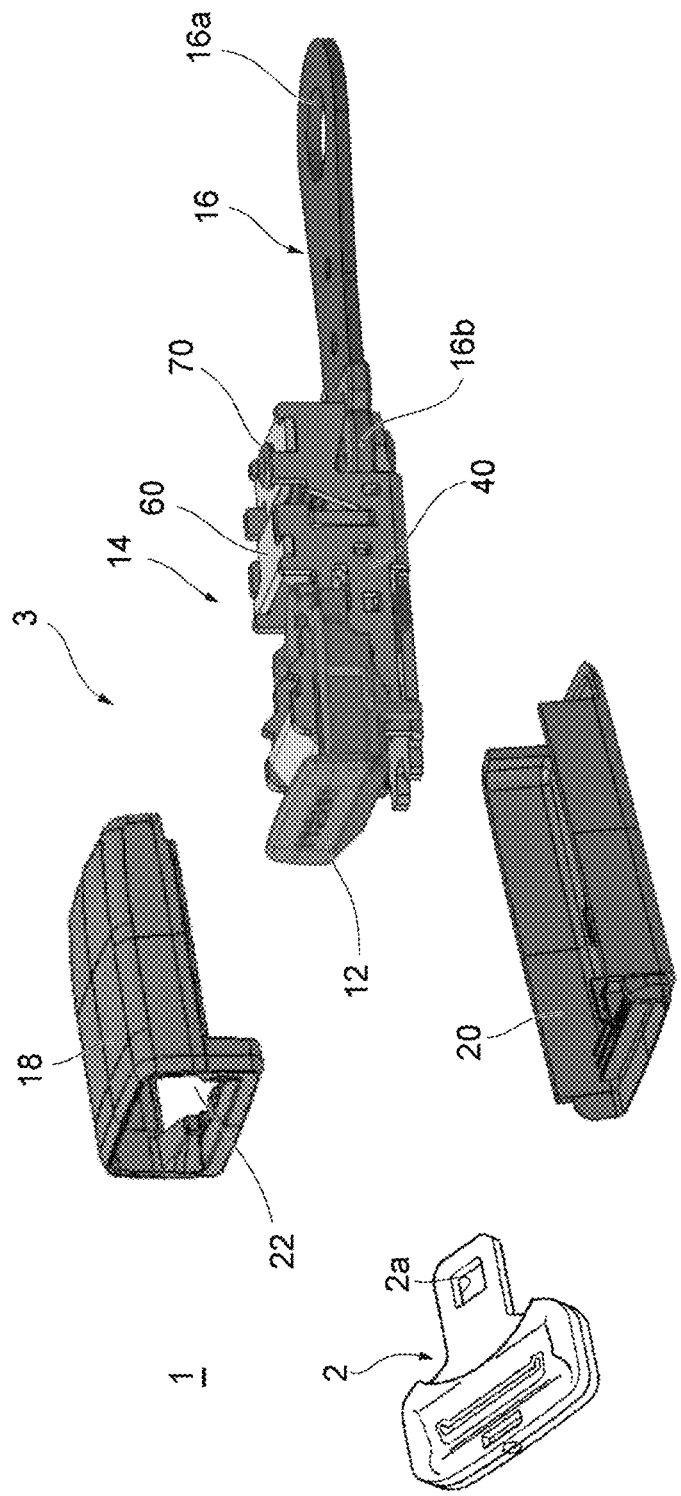
FIG. 2 is a perspective view showing the buckle of FIG. 1 with the outer casing of the buckle being disassembled, together with a tongue.

As shown in FIGS. 1 and 2, a seat belt device 1 has a tongue 2 to which a webbing, not shown, is attached, and a buckle 3 that detachably locks the tongue 2. The tongue 2 can be fixed just by inserting the tongue 2 into an insertion opening 10 of the buckle 3 and can be released just by pressing a release button 12. The seat belt device 1 is, for example, provided in association with a seat of a vehicle, and the buckle 3 is provided so as to be located in the proximity of the lower back part of a passenger seated on the seat.

The buckle 3 has a buckle body 14 and a buckle stay 16. An outer casing of the buckle body 14 is constituted by an upper cover 18 and a lower cover 20, and an opening 22 is formed at the front side of the upper cover 18. In the opening 22, the front part of the release button 12 is exposed, and the insertion opening 10 for the tongue 2 is formed below the release button 12.

The buckle stay 16 has a base end portion 16a and a tip end portion 16b. The base end portion 16a is fixed to a vehicle body. The tip end portion 16b couples the buckle body 14 to the buckle stay 16 such that the buckle body 14 is movable with respect to the buckle stay 16. In the present embodiment, the buckle 3 is configured as what is commonly referred to as a swing buckle. For example, the buckle body 14 is configured to be rotatable with respect to the buckle stay 16 in the front-rear direction of a seat, as indicated by an arrow 24, and tiltable in the width direction of the seat, as indicated by an arrow 26. A predetermined rotatable range is, for example, 30 degrees or 60 degrees, and a predetermined tiltable range is, for example, 15 degrees.

Figure 3:
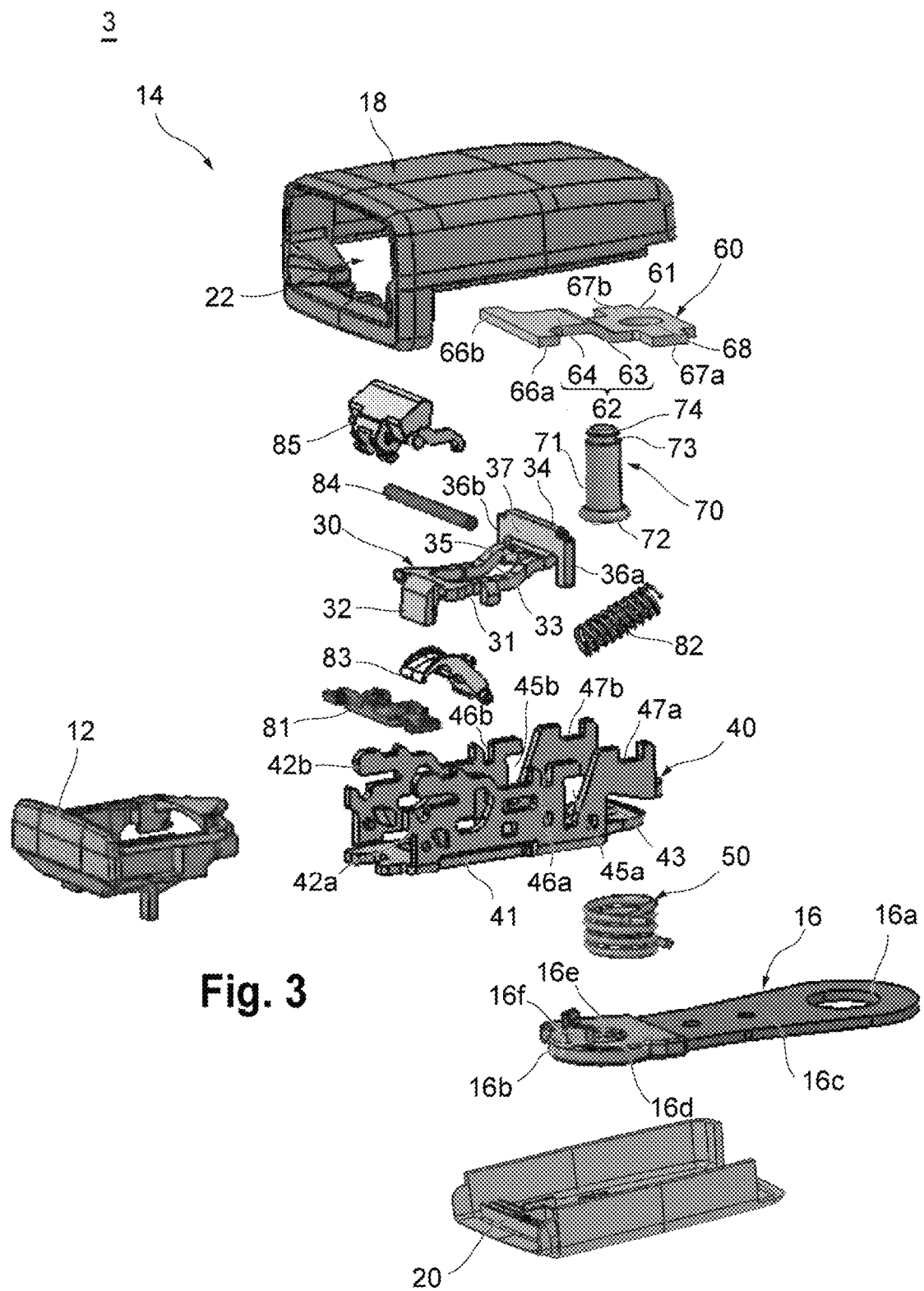
FIG. 3 is an exploded perspective view of the buckle of FIG. 1.

As shown in FIG. 3, the buckle stay 16 has an elongated plate-like shape as a whole. The buckle stay 16 is formed by, for example, integrally molding a collar 16d made of resin, at one end of a stay body 16c made of metal. The other end of the stay body 16c constitutes the base end portion 16a of the buckle stay 16, and the base end portion 16a has a fixing hole formed therein for fixation to the vehicle body. The collar 16d constitutes the tip end portion 16b of the buckle stay 16, and the collar 16d has a through hole 16e formed therein. On the upper surface of the collar 16d, a spring fixing portion 16f is provided so as to protrude around and in the vicinity of the through hole 16e. As described in detail later, a support shaft 70 is inserted through the through hole 16e, and a coil spring 50 is arranged so as to be fitted around the outside of the support shaft 70 and fixed by the spring fixing portion 16f (see FIG. 2).

As shown in FIG. 3, the buckle body 14 has a latch member 30, a buckle base 40, the coil spring 50 (elastic member), a bridging member 60 and the support shaft 70. The buckle body 14 also has an ejector 81, an ejector spring 82, a cantilever 83, a lock bar 84, and a counterweight 85, as members associated mainly with operation of the latch member 30 and the release button 12. Since the latter members (81-85) are known techniques, in the present embodiment, the description of the latter members will be limited to the extent necessary and the former members (30, 40, 50, 60 and 70) will be described in detail.

The latch member 30 is engaged with the tongue 2 when the tongue 2 is inserted into the buckle 3. The latch member 30 is formed of, for example, metal, and the frame 31 thereof has a latch protrusion 32 at the front end, an opening 33 in the middle, and a support arch 34 at the rear end. The latch protrusion 32 is a portion that engages with and disengages from the latch hole 2a of the tongue 2 (see FIG. 2), and extends downward from the frame 31. At an edge of the opening 33 at the side toward the support arch 34, a spring hook protruding portion 35 is formed, and the ejector spring 82 is connected to the spring hook protruding portion 35. The support arch 34 has a pair of pillar portions 36a and 36b extending in the up-down direction and a beam portion 37 connecting the upper parts of the pillar portions 36a and 36b.

Figure 5:
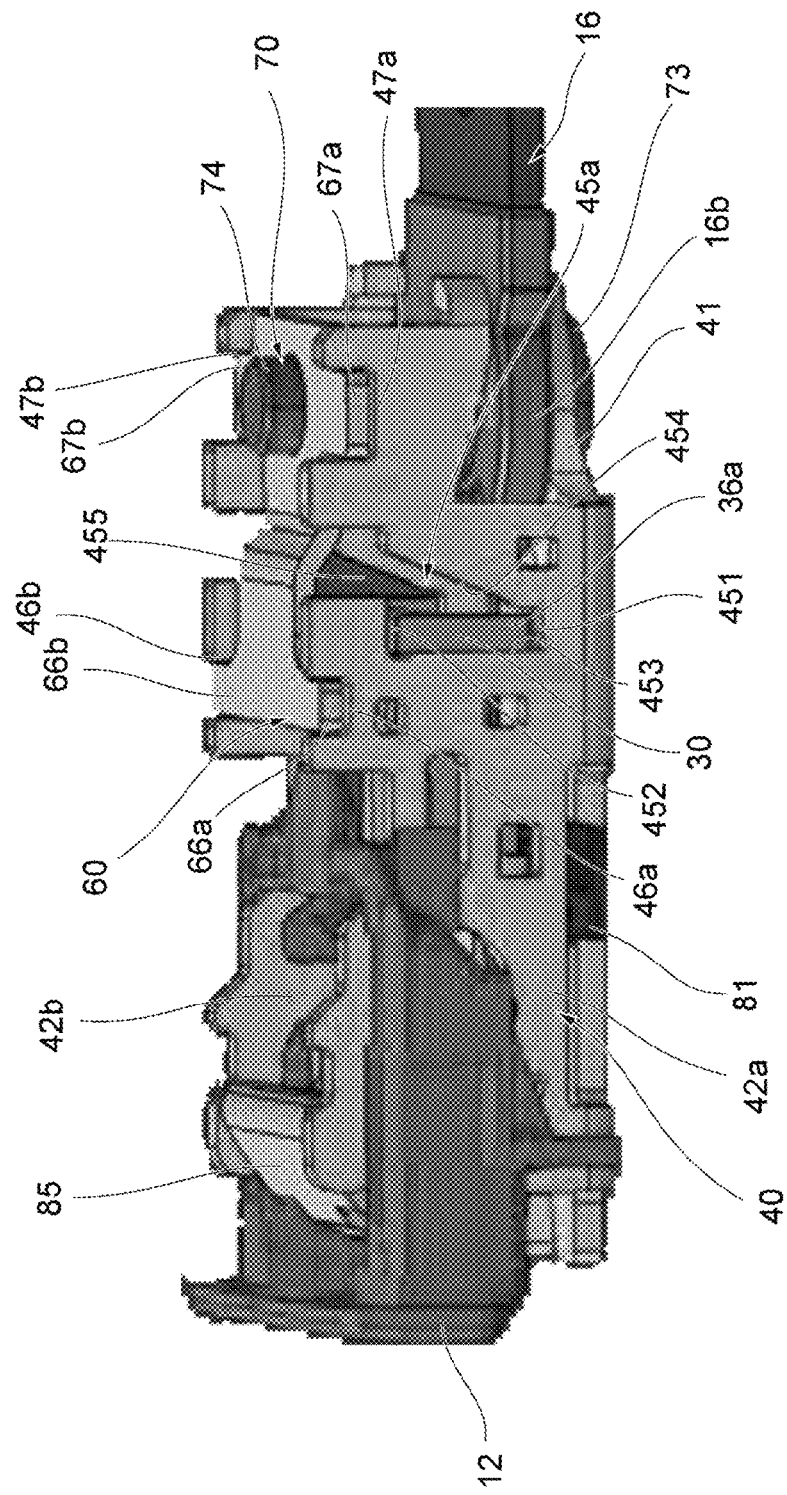
FIG. 5 is a perspective view of the buckle of FIG. 4 as viewed from a side.

The latch member 30 rotates about the lower ends of the pillar portions 36a and 36b in conjunction with the insertion of the tongue 2, and the latch protrusion 32 is inserted into the latch hole 2a of the tongue 2 and engages therewith. Specifically, when the tongue 2 is inserted into the insertion opening 10 of the buckle 3, the ejector 81 slides rearward, and the cantilever 83 coupled to the ejector 81 rotates due to the repulsion of the ejector spring 82, thereby pressing down the lock bar 84. The lock bar 84 then presses down the latch member 30, causing the latch member 30 to rotate forward about the lower ends of the pillar portions 36a and 36b, and the latch protrusion 32 is inserted into the latch hole 2a of the tongue 2. FIG. 5 shows a state in which the latch member 30 has rotated and is engaged with the tongue 2 (the tongue 2 is not shown), and in such engaged state, the pillar portions 36a and 36b are in a vertical position.

This engagement is released when the release button 12 is pressed. When pressed, the release button 12 moves the lock bar 84, and the cantilever 83 swiftly slides toward the insertion opening 10 together with the ejector 81 due to the repulsion of the ejector spring 82. This sliding of the ejector 81 causes the tongue 2 to be ejected from the insertion opening 10. In such disengaged state, the latch member 30 is rotated rearward due to the repulsion of the ejector spring 82, and the pillar portions 36a and 36b are in a rearwardly tilted position.

It should be noted that the counterweight 85 is rotatably mounted to the release button 12 and, when an inertia force is applied to the release button 12, rotates to prevent the movement of the release button 12 in a direction of release (i.e., prevent an unexpected release of the tongue 2).

The buckle base 40 has a bottom wall 41, as well as a first side wall 42a and a second side wall 42b that stand up from opposite side edges of the bottom wall 41. The buckle base 40 is formed so as to have an approximately rectangular U-shape as a whole and is a member that is also referred to as a channel. The buckle base 40 is formed of, for example, metal.

The front part of the upper surface of the bottom wall 41 constitutes an insertion path for the tongue 2 in the buckle body 14. The tip end portion 16b of the buckle stay 16 is placed on the rear part of the upper surface of the bottom wall 41 (see FIG. 5). A through hole 43 is formed in the center of the rear part of the bottom wall 41. The position of the through hole 43 corresponds to the position of the through hole 16e of the buckle stay 16. The support shaft 70 is inserted through the through holes 43 and 16e from the lower side of the bottom wall 41.

The side walls 42a and 42b respectively have latch holding portions 45a and 45b that hold the latch member 30. The latch holding portions 45a and 45b are each formed of a cutout extending from an upper end of each of the side walls 42a and 42b and hold the pillar portions 36a and 36b of the latch member 30.

Specifically, as shown in FIG. 5, the latch holding portion 45a is defined by: a lower wall 451 on which the latch member 30 is placed; an upper wall 452 facing the lower wall 451; a front wall 453 connected to front ends of the lower wall 451 and the upper wall 452; and a rear wall 454 facing the front wall 453, the upper end of the rear wall 454 being located on a rear side with respect to the lower end of the rear wall 454. The upper end of the rear wall 454 and the upper wall 452 are spaced away from each other by the cutout extending from the upper end of the side wall 42a. In other words, the space surrounded by the lower wall 451, the upper wall 452, the front wall 453 and the rear wall 454 opens upward via space 455 (cutout portion) which is formed of the cutout at the upper end of the side wall 42a. The latch holding portion 45b also has the same configuration.

In arranging the latch member 30 so as to be held by the latch holding portions 45a and 45b that are configured as above, the latch member 30 is passed, from above the side walls 42a and 42b, through the space 455, so as to be inserted between the upper end of the rear wall 454 and the upper wall 452, and the lower ends of the pillar portions 36a and 36b are each placed on the lower wall 451. As shown in FIG. 5, in a state where the tongue 2 is engaged with the latch member 30, the front surfaces of the pillar portions 36a and 36b, which are in a vertical position, each abut or come close to the front wall 453. On the other hand, in a state where the tongue 2 is disengaged, the rear surfaces of the pillar portions 36a and 36b, which are in a rearwardly tilted position, each abut or come close to the rear wall 454.

The side walls 42a and 42b respectively have front engagement grooves 46a and 46b that are respectively formed on a front side with respect to the latch holding portions 45a and 45b, and also respectively have rear engagement grooves 47a and 47b that are respectively formed on a rear side with respect to the latch holding portions 45a and 45b. A bridging member 60 is assembled to the front engagement grooves 46a and 46b and the rear engagement grooves 47a and 47b (see FIGS. 2, 4 and 5).

The front engagement groove 46a and the rear engagement groove 47a are formed at the upper end of the side wall 42a, and the front engagement groove 46b and the rear engagement groove 47b are formed at the upper end of the side wall 42b. The front engagement grooves 46a and 46b and the rear engagement grooves 47a and 47b are each formed so as to have a cross-sectional shape that opens upward.

The front engagement grooves 46a and 46b and the rear engagement grooves 47a and 47b are respectively offset from each other in the up-down direction. In the present embodiment, the bottom parts of the front engagement grooves 46a and 46b are respectively located higher than the bottom parts of the rear engagement grooves 47a and 47b (see FIG. 5). However, in other embodiments, they may be located at the same height in the up-down direction.

Figure 4:
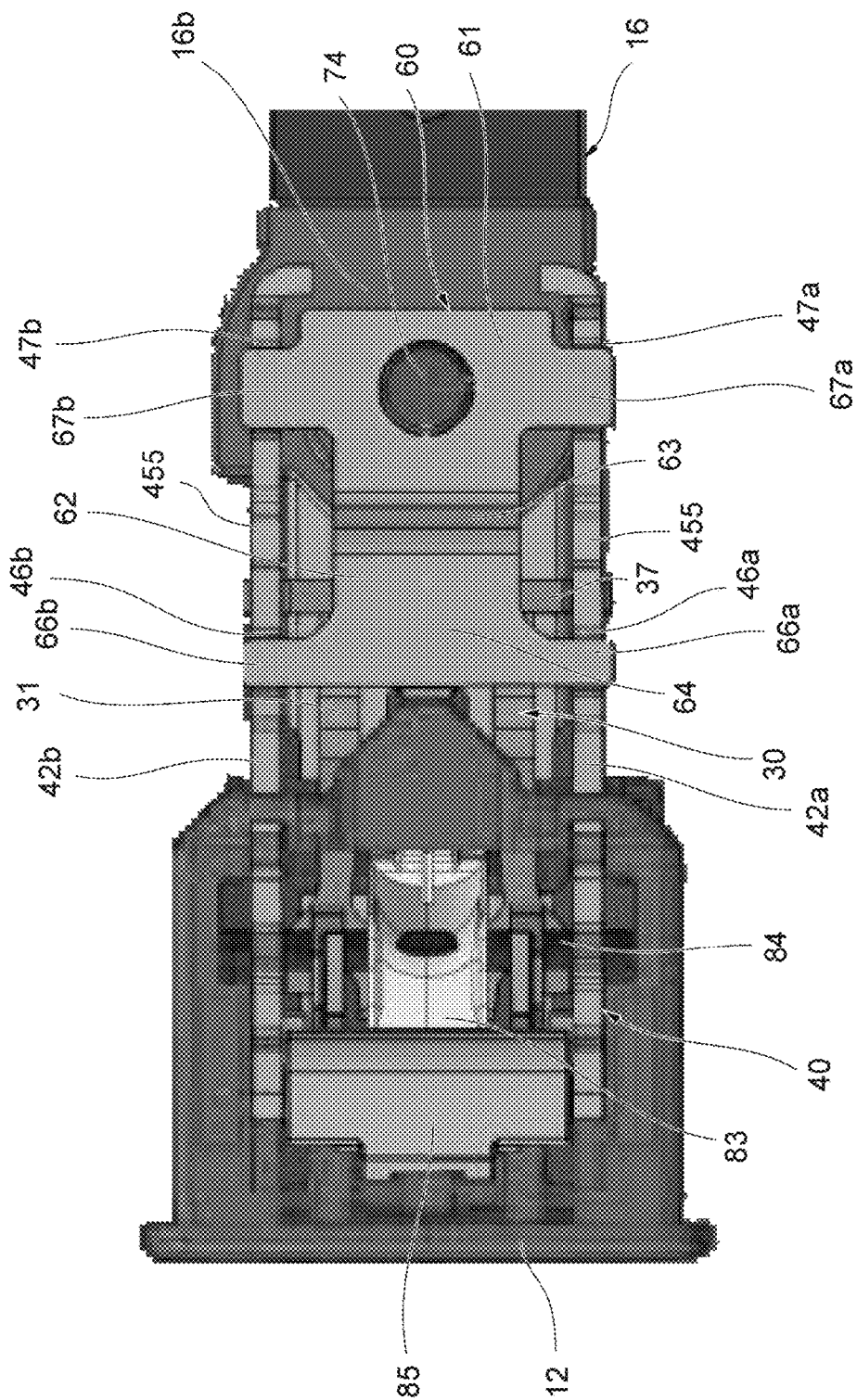
FIG. 4 is a plan view showing the buckle of FIG. 1 with the outer casing being removed and a latch member being engaged.

The front engagement grooves 46a and 46b are arranged symmetrically with respect to the front-rear direction, and the rear engagement grooves 47a and 47b are arranged symmetrically with respect to the front-rear direction (see FIG. 4). Accordingly, the imaginary line connecting the front engagement grooves 46a and 46b and the imaginary line connecting the rear engagement grooves 47a and 47b are parallel to each other and orthogonal to the front-rear direction. However, in other embodiments, one or both of the sets of engagement grooves may be arranged asymmetrically.

The coil spring 50 is arranged on a rear side with respect to the latch holding portions 45a and 45b. Further, the coil spring 50 is arranged between the bridging member 60 and the tip end portion 16b of the buckle stay 16. For example, the upper end of the coil spring 50 is in contact with the bridging member 60 and the lower end of the coil spring 50 is fixed to the spring fixing portion 16f of the buckle stay 16. Further, the coil spring 50 is arranged so as to be fitted around the outside of the support shaft 70.

The coil spring 50 presses downward on the tip end portion 16b of the buckle stay 16. In other words, the coil spring 50 is pressed by the bridging member 60 toward the bottom wall 41 of the buckle base 40. Further, when the buckle base 40 has tilted and/or rotated with respect to the buckle stay 16 as described above, the coil spring 50 acts to urge the buckle base 40 to return to the original position.

Specifically, when the buckle base 40 has tilted in a first direction (the direction perpendicular to the wall surface of the bottom wall 41, indicated by the arrow 26 in FIG. 1) with respect to the buckle stay 16, the coil spring 50 is compressed and deformed; then, the coil spring 50 tries to return to its original shape, thereby acting to urge the buckle base 40 to return to the original position. When the buckle base 40 has rotated in a second direction (the direction parallel to the wall surface of the bottom wall 41, indicated by the arrow 24 in FIG. 1) with respect to the buckle stay 16, the coil spring 50 is twisted and deformed; then, the coil spring 50 tries to return to its original shape, thereby acting to urge the buckle base 40 to return to the original position.

The bridging member 60 has a plate-like shape and is formed of, for example, metal. The bridging member 60 serves as a spring retainer (retaining member) that presses the coil spring 50 toward the bottom wall 41 of the buckle base 40. For example, the bridging member 60 presses the coil spring 50 toward the bottom wall 41 of the buckle base 40 via the tip end portion 16b of the buckle stay 16.

The bridging member 60 has a body portion 61 that presses the coil spring 50 and an extension portion 62 that extends forward from the body portion 61. The extension portion 62 has an inclined portion 63 extending diagonally upward from the body portion 61 and a horizontal portion 64 extending horizontally from the inclined portion 63. Therefore, the horizontal portion 64 and the body portion 61 are offset from each other in the up-down direction. This corresponds to the offset between the front engagement grooves 46a and 46b and the rear engagement grooves 47a and 47b of the buckle base 40. However, in other embodiments, it is also possible to position the horizontal portion 64 and the body portion 61 at the same height in the up-down direction, in which case it is possible to omit the inclined portion 63.

The bridging member 60 is configured to be assemblable to the side walls 42a and 42b so as to span the latch holding portions 45a and 45b in the front-rear direction. In this embodiment, the extension portion 62 of the bridging member 60 extends forward from the body portion 61 beyond the latch holding portions 45a and 45b, and the bridging member 60 has front engagement protrusions 66a and 66b and rear engagement protrusions 67a and 67b that are respectively assemblable to the front engagement grooves 46a and 46b and the rear engagement grooves 47a and 47b.

The front engagement protrusions 66a and 66b are formed outward from the extension portion 62, and the rear engagement protrusions 67a and 67b are formed outward from the body portion 61. Specifically, the front engagement protrusions 66a and 66b are formed at the front end part of the horizontal portion 64 of the extension portion 62 so as to extend outward, and the rear engagement protrusions 67a and 67b are formed at the middle part in the front-rear direction of the body portion 61 so as to extend outward. The front engagement protrusions 66a and 66b are each sized such that a part (end part) of each of the front engagement protrusions 66a and 66b slightly protrudes outward from each of the side walls 42a and 42b when assembled to the front engagement grooves 46a and 46b. Likewise, the rear engagement protrusions 67a and 67b are each sized such that a part (end part) of each of the rear engagement protrusions 67a and 67b protrudes outward from each of the side walls 42a and 42b when assembled to the rear engagement grooves 47a and 47b. Whether or not the front engagement protrusions 66a and 66b and the rear engagement protrusions 67a and 67b protrude from the side walls 42a and 42b, and the amount of such protrusion, may be determined as appropriate.

An insertion hole 68 is formed between the rear engagement protrusions 67a and 67b. The insertion hole 68 is formed in the central part of the body portion 61, and the support shaft 70 is inserted therethrough. The upper end portion of the support shaft 70 is riveted on the upper surface of the body portion 61, thereby fixing the support shaft 70 to the bridging member 60.

As shown in FIGS. 4 and 5, in a state in which the bridging member 60 is assembled to the side walls 42a and 42b, the body portion 61 and the extension portion 62 are located on an inner side of the side walls 42a and 42b, and the front engagement protrusions 66a and 66b and the rear engagement protrusions 67a and 67b are respectively fitted in the front engagement grooves 46a and 46b and the rear engagement grooves 47a and 47b. With such configuration, a position of the bridging member 60 in the horizontal direction with respect to the side walls 42a and 42b is limited or fixed.

It should be noted that, in such fitted state, the bridging member 60 is placed on the upper ends of the side walls 42a and 42b and a slight backlash may exist. In other embodiments, the front engagement protrusions 66a and 66b and the rear engagement protrusions 67a and 67b may be fitted without a backlash, or press fitted, into the front engagement grooves 46a and 46b and the rear engagement grooves 47a and 47b, respectively.

As shown in FIG. 3, the support shaft 70 is constituted by, for example, a stepped rivet or pin. The support shaft 70 has a shaft portion 71, a large diameter portion 72 connected to the lower end of the shaft portion 71, and a head portion 74 connected to the upper end of the shaft portion 71 via a stepped portion 73. Except for the large diameter portion 72, the support shaft 70 is formed so as to have a diameter smaller than the diameter of the through hole 43 of the buckle base 40 and the diameter of the through hole 16e of the buckle stay 16. In the state in which the support shaft 70 is inserted through the through holes 43 and 16e from the lower side of the bottom wall 41, the large diameter portion 72 abuts the lower surface (outer surface) of the bottom wall 41.

In such inserted state, the buckle base 40 and the buckle stay 16 are coupled by the shaft portion 71, and the buckle base 40 tilts and rotates with respect to the buckle stay 16 as described above, with the coupling portion (shaft portion 71) being the support point. The coil spring 50 is fitted around the outside of the support shaft 70, and the stepped portion 73 is inserted through the insertion hole 68 of the bridging member 60. Then, the head 74 is riveted on the upper surface of the body portion 61 of the bridging member 60, thereby fixing the support shaft 70 to the bridging member 60. With such fixation, the position of the bridging member 60 in the vertical direction (height direction) with respect to the side walls 42a and 42b of the buckle base 40 is limited or fixed.

In other embodiments, the lower end of the support shaft 70 may be riveted. Specifically, the large diameter portion 72 may be brought into abutment with the upper surface of the body portion 61 and the head portion 74 may be riveted on the lower surface (outer surface) of the bottom wall 41, thereby fixing the support shaft 70 to the buckle base 40. With such fixation, the position of the bridging member 60 in the vertical direction (height direction) with respect to the side walls 42a and 42b of the buckle base 40 is also limited or fixed.

In the present embodiment, in assembling the latch member 30 and the bridging member 60 to the buckle base 40, the pillar portions 36a and 36b of the latch member 30 are first inserted from space 455 of the side walls 42a and 42b and then are each slid along the rear wall 454, and the lower ends of the pillar portions 36a and 36b are each placed on the lower wall 451. As a result, the latch member 30 is held in the latch holding portions 45a and 45b.

Next, each of the buckle stay 16, the coil spring 50 and the support shaft 70 is arranged at a predetermined position with respect to the buckle base 40. Then, the stepped portion 73 of the support shaft 70 is inserted through the insertion hole 68 of the bridging member 60, and four engagement protrusions 66a, 66b, 67a and 67b of the bridging member 60 are respectively fitted into four engagement grooves 46a, 46b, 47a and 47b of the side walls 42a and 42b. Subsequently, while pressing down the bridging member 60 so as to press in the coil spring 50, the upper end portion of the support shaft 70 is riveted so as to fix the support shaft 70 to the bridging member 60. As a result, the bridging member 60 is assembled to the side walls 42a and 42b so as to span the latch holding portions 45a and 45b.

As described above, in the buckle 3 of the seat belt device 1 according to the present embodiment, the latch holding portions 45a and 45b are each formed of a cutout extending from the upper end of each of the side walls 42a and 42b of the buckle base 40, and the bridging member 60 is configured to be assemblable to the side walls 42a and 42b so as to span the latch holding portions 45a and 45b.

With such configuration, in holding the latch member 30 in the latch holding portions 45a and 45b, the latch member 30 can be inserted, from above, into the cutout portions (space 455) at the upper ends of the side walls 42a and 42b so as to be arranged in the latch holding portions 45a and 45b. This allows the latch member 30 to be held in the latch holding portions 45a and 45b without being twisted. Further, since the bridging member 60 is assembled to the side walls 42a and 42b so as to span the latch holding portions 45a and 45b, deformation in the direction of widening the cutout portions (space 455) at the upper ends of the side walls 42a and 42b can be suppressed upon load input due to a vehicle collision or the like. Thus, both improvement of the assemblability of the latch member 30 to the buckle base 40 and improvement of the breaking strength and robustness of the buckle base 40 can be achieved.

Further, the side walls 42a and 42b respectively have the front engagement grooves 46a and 46b formed on a front side with respect to the latch holding portions 45a and 45b and also respectively have the rear engagement grooves 47a and 47b formed on a rear side with respect to the latch holding portions 45a and 45b, and the bridging member 60 has the front engagement protrusions 66a and 66b and the rear engagement protrusions 67a and 67b that are respectively assemblable to the front engagement grooves 46a and 46b and the rear engagement grooves 47a and 47b. With such configuration, the bridging member 60 is assembled to four places of the side walls 42a and 42b, the four places being located in front and rear sides with respect to the latch holding portions 45a and 45b, which allows the bridging member 60 to be assembled with better balance. In particular, since the front engagement grooves 46a and 46b are arranged symmetrically with respect to the front-rear direction and the rear engagement grooves 47a and 47b are arranged symmetrically with respect to the front-rear direction, the bridging member 60 can be assembled with even better balance. Accordingly, deformation in a direction of widening the cutout portions (space 455) at the upper ends of the side walls 42a and 42b can be more effectively suppressed.

Further, the engagement groove 46a and 47a are formed at the upper end of the side wall 42a, and the engagement grooves 46b and 47b are formed at the upper end of the side wall 42b. This allows for assembly of the bridging member 60 by fitting the bridging member 60, from above, into the side walls 42a and 42b, thereby also improving the assemblability of the bridging member 60 to the buckle base 40.

Moreover, the buckle 3 has the coil spring 50 arranged on a rear side with respect to the latch holding portions 45a and 45b, and the bridging member 60 presses the coil spring 50 toward the bottom wall 41. This allows the bridging member 60 to be effectively utilized as a retainer for the coil spring 50.

In addition, in the seat belt device 1, the base end portion 16a of the buckle stay 16 is fixed to the vehicle body, and the tip end portion 16b of the buckle stay 16 is coupled to the buckle base 40 so that the buckle base 40 can rotate in the front-rear direction of the vehicle seat and can tilt in the width direction of the vehicle seat. The coil spring 50 is arranged between the bridging member 60 and the tip end portion 16b of the buckle stay 16, and when the buckle base 40 has tilted and/or rotated, the coil spring 50 acts to urge the buckle base 40 to return to the original position. Such configuration can achieve both improvement of the assemblability of the latch member 30 and improvement of the breaking strength and robustness of the buckle base 40 by utilizing the part (bridging member 60) related to the swing structure of the buckle 3, without increasing the number of parts.

The above-described embodiments are intended to facilitate the understanding of the present invention and not to limit the interpretation of the present invention. Each element in the embodiments, as well as its arrangement, materials, conditions, shape, and size, etc., are not limited to those illustrated and may be changed as appropriate.

For example, although the coil spring 50 is used as the elastic member in the above description, the elastic member is not limited thereto. For example, other types of spring member such as a plate spring may be used, and an elastic body such as rubber may also be used.

Further, although the number of the engagement protrusions (66a, 66b, 67a and 67b) of the bridging member 60 is four in the above description, the number is not limited thereto. The number of the engagement protrusions (66a, 66b, 67a and 67b) of the bridging member 60 and the number of the corresponding engagement grooves (46a, 46b, 47a and 47b) of the side walls 42a and 42b may each be more than four or less than four. Further, it is also possible to form one or more or all of the engagement grooves of the side walls 42a and 42b at positions other than the upper ends of the side walls 42a and 42b.

Moreover, the front engagement protrusions 66a and 66b of the bridging member 60 are not required to have the same shape or the same size. Likewise, the rear engagement protrusions 67a and 67b of the bridging member 60 are not required to have the same shape or the same size.

In addition, in the above description, the front engagement protrusions 66a and 66b of the bridging member 60 are arranged symmetrically with respect to the front-rear direction, and the rear engagement protrusions 67a and 67b of the bridging member 60 are arranged symmetrically with respect to the front-rear direction; however, the configuration is not limited thereto. For example, the front engagement protrusions 66a and 66b and/or the rear engagement protrusions 67a and 67b may be partially asymmetric to each other while having portions arranged symmetrically with respect to the front-rear direction. For example, one of the front engagement protrusions 66a and 66b may have a portion formed so as to extend forward or rearward from an end portion of the symmetric portion. With such partially asymmetric configuration, an orientation in which the bridging member 60 is to be assembled to the side walls 42a and 42b is uniquely determined, and therefore, a mistake-proofing effect can be expected to be obtained.

Further, in one example, the cross-sectional shape of each of the front engagement grooves 46a and 46b and the rear engagement grooves 47a and 47b is rectangular, as shown in FIG. 5; however, various shapes can be employed as long as the grooves each open upward. Another example is shown in FIG. 6.

Figure 6:
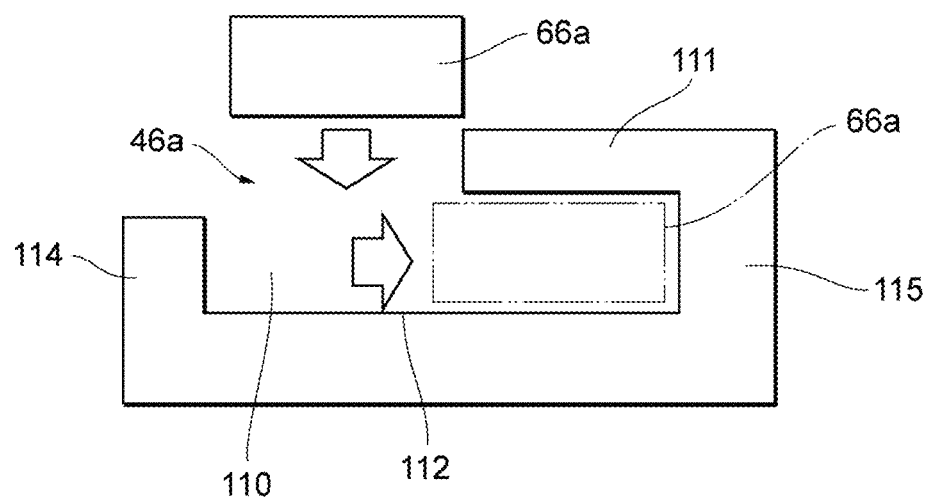
FIG. 6 is a side view of a buckle base showing a front engagement groove according to a modification in an enlarged manner.

As shown in FIG. 6, the front engagement groove 46a, which opens upward, has a cover portion 111 that covers a part of groove space 110. The groove space 110 of the front engagement groove 46a is defined by a groove bottom portion 112 and groove side wall portions 114 and 115 standing up from the opposite side edges of the groove bottom portion 112. The cover portion 111 extends from the upper end of one groove side wall portion 115 toward the other groove side wall portion 114. The cover portion 111 and the groove side wall portion 114 are spaced away from each other such that the front engagement protrusion 66a can be inserted. The cover portion 111 and the groove bottom portion 112 are configured to be able to receive the front engagement protrusion 66a therebetween.

In assembling the front engagement protrusion 66a to the front engagement groove 46a configured as above, the front engagement protrusion 66a is first inserted between the cover portion 111 and the groove side wall portion 114 and moved downward to be placed on the groove bottom portion 112, and the front engagement protrusion 66a is then moved toward the groove side wall portion 115. The front engagement protrusion 66a assembled as such is sandwiched between the cover portion 111 and the groove bottom portion 112, and the position in the height direction is limited or fixed (see the long dashed double-short dashed line in FIG. 6).

Although the bridging member 60 and the support shaft 70 are separate in the above embodiments, they may be integrally formed. For example, the support shaft 70 is only required to protrude at least downwardly from the body portion 61 of the bridging portion 60 such that the coil spring 50 is arranged so as to be fitted around the outside of the support shaft 70. In one example, the upper end portion of the shaft portion 71 of the support shaft 70 may be integrally connected to the lower surface of the body portion 61. In the case of such integrated structure, the support shaft 70 is not necessarily required to have a portion extending upward from the body portion 61, and the head portion 74 may be omitted.

REFERENCE SIGNS LIST

1: Seat belt device; 2: Tongue; 2a: Latch hole; 3: Buckle; 10: Insertion opening; 12: Release button; 14: Buckle body; 16: Buckle stay; 16a: Base end portion; 16b: Tip end portion; 16c: Stay body; 16d: Collar; 16e: Through hole; 16f: Spring fixing portion; 18: Upper cover; 20: Lower cover; 22: Opening; 24, 26: Arrow; 30: Latch member; 31: Frame; 32: Latch protrusion; 33: Opening; 34: Support arch; 35: Spring hook protruding portion; 36a, 36b: Pillar portion; 37: Beam portion; 40: Buckle base; 41: Bottom wall; 42a: First side wall; 42b: Second side wall; 43: Through hole; 45a, 45b: Latch holding portion; 46a, 46b: Front engagement groove; 47a, 47b: Rear engagement groove; 50: Elastic member (coil spring); 60: Bridging member; 61: Body portion; 62: Extension portion; 63: Inclined portion; 64: Horizontal portion; 66a, 66b: Front engagement protrusion; 67a, 67b: Rear engagement protrusion; 68: Insertion hole; 70: Support shaft; 71: Shaft portion; 72: Large diameter portion; 73: Stepped portion; 74: Head portion; 81: Ejector; 82: Ejector spring; 83: Cantilever; 84: Lock bar; 85: Counterweight; 110: Groove space; 111: Cover portion; 112: Groove bottom portion; 114, 115: Groove side wall portion; 451: Lower wall; 452: Upper wall; 453: Front wall; 454: Rear wall; 455: Space

What is claimed is:

1. A buckle for a seat belt device, comprising:
   a latch member configured to be engaged with a tongue when the tongue is inserted into the buckle;
   a buckle base having a bottom wall and a first side wall and a second side wall that stand up from opposite side edges of the bottom wall, each of the first and second side walls having a latch holding portion that holds the latch member, the latch holding portion being formed of a cutout extending from an upper end of each of the first and second side walls; and
   a bridging member configured to be assembled to the first and second side walls so as to span the respective latch holding portions in a front-rear direction, the bridging member fixedly positioned in a vertical direction with respect to the first and second side walls of the buckle base.

2. The buckle for the seat belt device according to claim 1, wherein each of the first and second side walls has a front engagement groove formed on a front side with respect to the latch holding portion and a rear engagement groove formed on a rear side with respect to the latch holding portion, and
   the bridging member has front engagement protrusions and rear engagement protrusions that are configured to be assembled to the respective front engagement grooves and the respective rear engagement grooves.

3. The buckle for the seat belt device according to claim 2, wherein the front engagement grooves and the rear engagement grooves are formed at the respective upper ends of the first and second side walls.

4. The buckle for the seat belt device according to claim 2, wherein at least one of the front engagement protrusions and the rear engagement protrusions have portions arranged symmetrically with respect to the front-rear direction.

5. The buckle for the seat belt device according to claim 2, further comprising an elastic member arranged on a rear side with respect to the latch holding portions, wherein the bridging member presses the elastic member toward the bottom wall.

6. The buckle for the seat belt device according to claim 5, wherein the bridging member comprises:
   a body portion that is located on an inner side of the first and second side walls and presses the elastic member, and
   an extension portion that is located on the inner side of the first and second side walls and extends from the body portion beyond the latch holding portions,
   wherein the front engagement protrusions are formed outward from the extension portion, and the rear engagement protrusions are formed outward from the body portion.

7. The buckle for the seat belt device according to claim 6, wherein the front engagement protrusions partially protrude outward from the first and second side walls, and the rear engagement protrusions partially protrude outward from the first and second side walls.

8. The buckle for the seat belt device according to claim 6, wherein the elastic member is arranged so as to be fitted around an outside of a support shaft, and the body portion of the bridging member has an insertion hole for inserting the support shaft, the insertion hole being located between the rear engagement protrusions.

9. The buckle for the seat belt device according to claim 6, wherein the elastic member is arranged so as to be fitted around an outside of a support shaft, and the support shaft protrudes at least downwardly from the body portion of the bridging member.

10. The buckle for the seat belt device according to claim 1, wherein, in each of the first and second side walls, the latch holding portion is defined by:
    a lower wall on which the latch member is placed;
    an upper wall facing the lower wall;
    a front wall connected to front ends of the lower wall and the upper wall; and a rear wall facing the front wall, an upper end of the rear wall located on a rear side with respect to a lower end of the rear wall, wherein the upper end of the rear wall and the upper wall are spaced away from each other by the cutout extending from the upper end of each of the first and second side walls such that the latch member can be inserted between the upper end of the rear wall and the upper wall and arranged in the latch holding portions.

11. The buckle for the seat belt device according to claim 10, wherein the latch member has a pillar portion placed on the lower wall and the latch member is configured to rotate about a lower end of the pillar portion when the tongue is inserted into the buckle.

12. The buckle for the seat belt device according to claim 1, further comprising:

an elastic member arranged on a rear side with respect to the latch holding portions, and a buckle stay having a tip end portion and a base end portion, the tip end portion being coupled to the buckle base so that the buckle base can tilt within a predetermined range in a first direction perpendicular to a wall surface of the bottom wall and rotate within a predetermined range in a second direction parallel to the wall surface of the bottom wall, the base end portion being configured to be fixed to a vehicle body, wherein the elastic member is arranged between the bridging member and the tip end portion of the buckle stay, and when the buckle base tilts in the first direction and/or rotates in the second direction, the elastic member urges the buckle base to return to an original position.

13. A seat belt device comprising the buckle according to claim 1.

14. A buckle for a seat belt device, comprising:

a latch member configured to be engaged with a tongue when the tongue is inserted into the buckle;

a buckle base having a bottom wall and a first side wall and a second side wall that stand up from opposite side edges of the bottom wall, each of the first and second side walls having a latch holding portion that holds the latch member, the latch holding portion being formed of a cutout extending from an upper end of each of the first and second side walls; and a bridging member configured to be assembled to the first and second side walls so as to span the respective latch holding portions in a front-rear direction, wherein each of the first and second side walls has a front engagement groove formed on a front side with respect to the latch holding portion and a rear engagement groove formed on a rear side with respect to the latch holding portion, and the bridging member has front engagement protrusions and rear engagement protrusions that are configured to be assembled to the respective front engagement grooves and the respective rear engagement grooves of the buckle base.

* * * * *